United States Patent [19]
Akimoto et al.

[11] Patent Number: 5,466,994
[45] Date of Patent: Nov. 14, 1995

[54] FLY-BACK TRANSFORMER

[75] Inventors: Katsuyuki Akimoto; Takahiro Machida; Yoshinori Ishii, all of Kyoto, Japan

[73] Assignee: Mitsubishi Denki Kabushiki Kaisha, Tokyo, Japan

[21] Appl. No.: 279,891

[22] Filed: Jul. 25, 1994

[51] Int. Cl.⁶ .................................................. H01J 29/70
[52] U.S. Cl. ........................................ 315/411; 315/382.1
[58] Field of Search .................................. 315/411, 382, 315/382.1

[56] References Cited

U.S. PATENT DOCUMENTS

| 4,316,128 | 2/1982 | Shiratsuchi | 315/411 |
| 4,886,999 | 12/1989 | Yamane et al. | 313/414 |

FOREIGN PATENT DOCUMENTS

| 62-136970 | 6/1987 | Japan . |
| 63-4538 | 1/1988 | Japan . |
| 63-203063 | 8/1988 | Japan . |
| 1-125808 | 5/1989 | Japan . |

*Primary Examiner*—Theodore M. Blum

[57] ABSTRACT

A fly-back transformer for generating a focus voltage to be applied to a cathode-ray tube, includes an iron core, a primary coil, a D.C. voltage generating circuit, and a superimposing circuit. The primary coil is wound on the iron core for receiving a pulse voltage generated during a fly-back period of a horizontal sweep signal for the cathode-ray tube. The D.C. voltage generating circuit includes at least one secondary coil wound on the iron core, for generating, in response to the pulse voltage, a D.C. voltage. The superimposing circuit generates a parabolic-wave voltage from a voltage taken out from one of the at least one secondary coil, and superimposes the parabolic-wave voltage on the D.C. voltage to generate the focus voltage. Alternatively, the superimposing circuit generates a parabolic-wave voltage from a voltage taken out by a third coil wound on the iron core, which has one end connected to an end of the at least one secondary coil.

22 Claims, 3 Drawing Sheets

FLY-BACK TRANSFORMER

BACKGROUND OF THE INVENTION

1. Field of the Invention

The present invention relates to a fly-back transformer for generating D.C. voltages to be applied to respective electrodes of a Braun tube (or in other words a cathode-ray tube and herein after referred to as a CRT).

2. Description of the Related Art

FIG. 1 is a circuit diagram showing a conventional fly-back transformer. In the figure, reference numeral 1 represents an iron core of the fly-back transformer, and 2 is a primary coil wound on the iron core 1. Reference signs 3a to 3f represent secondary coils wound on the iron core 1, and 4a to 4f are rectifying diodes connected in series with the secondary coils 3a to 3f respectively. Reference numeral 5 represents a resistor connected to a connecting point between the secondary coil 3c and the diode 4d, and 6 is a variable resistor connected to another fixed terminal of the resistor 5. Reference numeral 7 represents a resistor connected in series with the variable resistor 6 at the another fixed terminal thereof, and 8 is a resistor connected to a movable terminal of the variable resistor 6. Reference numeral 9 is a CRT having terminals to which voltages are applied from the fly-back transformer, and 10 is an anode terminal to which an anode voltage is applied from the above-mentioned diode 4a. Reference numeral 11 is a focus terminal to which a focus voltage is applied from the above-mentioned resistor 8.

Next, the operation of the circuit shown in FIG. 1 will be described. At the primary coil 2 of the fly-back transformer, a pulse voltage, which is generated during a fly-back period of a horizontal sweep signal supplied to a horizontal deflection means (omitted in the figure) of the CRT 9, is inputted. Then, the pulse voltage is boosted and induced at the secondary coils 3a to 3f. The induced voltages are rectified and superimposed by the diodes 4a to 4f to obtain a high D.C. voltage. This high D.C. voltage is applied, as an anode voltage, to the anode terminal 10 of the CRT 9 through the diode 4a.

On the other hand, a D.C. voltage is taken out from a part of the secondary coils 3a to 3f (in the illustrated example, from a connecting point between the secondary coil 3c and the diode 4d), and the taken out D.C. voltage is divided by the resistor 5, the variable resistor 6, and the resistor 7 to be a focus voltage which is then applied to the focus terminal 11 of the CRT 9 through the resistor 8 connected to the movable terminal of the variable resistor 6. Here, instead of taking out the D.C. voltage from a part of the secondary coils 3a to 3f, the D.C. voltage may be taken out from a cathode side of any one of the diodes 4a to 4f depending on the required voltage as the focus voltage of the CRT 9.

As documents disclosing arts relating to the above-mentioned conventional fly-back transformer, there are known, for example, Japanese Patent Publication (Kokai) No. 62-136970 and Japanese Patent Publication No. 1-125808.

Since the conventional fly-back transformer is constructed as above, the focus voltage applied to the focus terminal 11 of the CRT 9 is fixed to a constant D.C. voltage. Therefore, in the CRT 9, an electron gun is designed on the condition that such a constant focus voltage is applied. Accordingly, there is a problem in the conventional fly-back transformer in that a part of the focus performance on the whole surface of the CRT 9 is sacrificed.

SUMMARY OF THE INVENTION

The present invention has been accomplished to solve the above-mentioned problem, and has an object to provide a fly-back transformer which can generate a focus voltage by which the optimum focus performance is obtained on the whole surface of a CRT.

According to the first aspect of the present invention, there is provided, for achieving the above object, a fly-back transformer for generating a focus voltage to be applied to a cathode-ray tube comprising a third coil wound on the iron core for generating a pulse voltage in response to the pulse voltage applied to the primary coil, and a superimposing circuit for superimposing the D.C. voltage taken out from the D.C. generating circuit including the secondary coil on the voltage taken out from the third coil to generate the focus voltage.

The third coil is wound separately from the secondary coil.

According to the second aspect of the present invention, the third coil may be a part of the secondary coil.

In the first or the second aspect of the present invention, the voltage taken out from the third coil is a parabolic-wave voltage synchronous with a horizontal sweep signal of the cathode-ray tube.

In the first or the second aspect of the present invention, the fly-back transformer further comprises integrating circuit for integrating the voltage taken out from the third coil to form a parabolic-wave voltage synchronous with a horizontal sweep signal of the cathode-ray tube.

In the first or the second aspect of the present invention, the D.C. voltage generating circuit comprises a plurality of secondary coils wound on the iron core and a plurality of diodes connected to the secondary coils in series respectively, for generating plurality of D.C. voltages to be applied to various electrodes of the cathode-ray tube.

As stated above, according to the first aspect of the present invention, since the focus voltage is obtained by superimposing the voltage taken out from the third coil with the D.C. voltage taken out from the D.C. voltage generating circuit, and since the voltage taken out from the third coil is synchronous with a horizontal sweep signal of the CRT, the focus voltage changes in synchronization with the horizontal sweep of the CRT, the optimum performance of the CRT can be realized throughout the whole surface of the CRT.

According to the second aspect of the present invention, since the third coil is realized by a part of the secondary coil, the fly-back transformer can be miniaturized.

The above and further objects and novel features of the invention will more fully appear from the following detailed description when the same is read in connection with the accompanying drawings. It is to be expressly understood, however, that the drawings are for the purpose of illustration only and are not intended as a definition of the limits of the invention.

DESCRIPTION OF THE PREFERRED EMBODIMENTS

Embodiment 1

Figure 1:
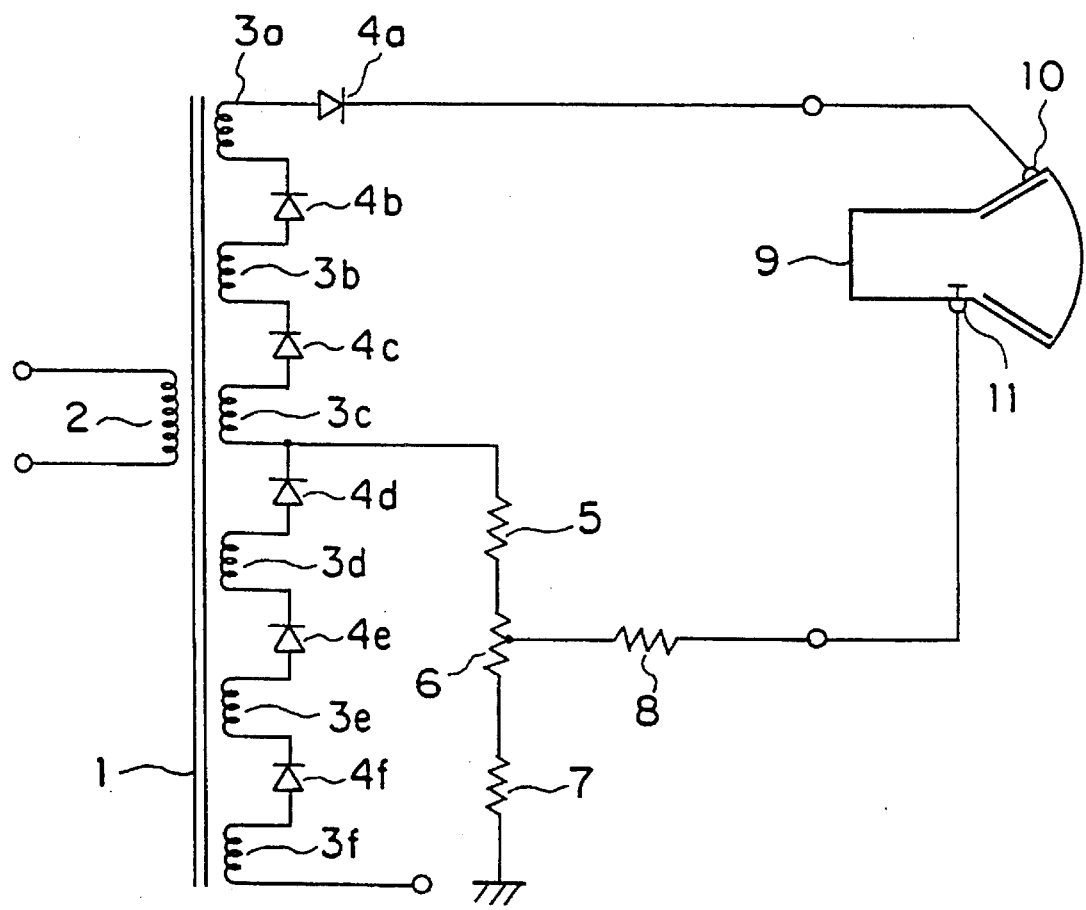
FIG. 1 is a circuit diagram showing a conventional fly-back transformer.
Figure 2:
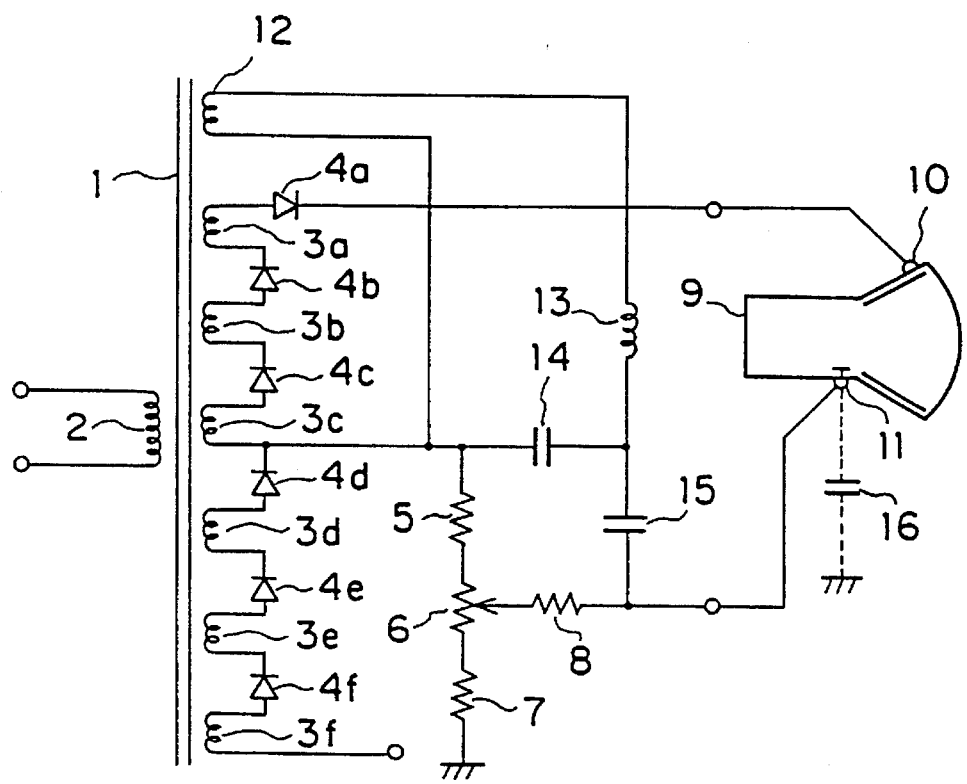
FIG. 2 is a circuit diagram showing a fly-back transformer according to an embodiment of the present invention.

In the following, an embodiment 1 of the present invention will be described with reference to FIGS. 2 and 3. In FIG. 2, reference numeral 1 represents an iron core, and 2 is a primary coil. Reference sings 3a to 3f represent secondary coils, and 4a to 4f are diodes. Reference numerals 5, 7, and 8 represent resistors, 6 is a variable resistor, 9 is a CRT, 10 is an anode terminal, and 11 is a focus terminal. These reference signs denote the same or corresponding parts as those in the conventional Fly-back transformer shown in FIG. 1, and therefore, the detailed description thereof are omitted here.

Reference numeral 12 represents a third coil for taking out a pulse voltage generated during a fly-back period of horizontal sweep signals and applied to the primary coil 2. Reference numerals 13 and 14 represent an inductor and a capacitor respectively for integrating the pulse voltage taken out by the third coil 12 to shape it into a parabolic wave. Reference numeral 16 represents a capacitance between electrodes at the focus terminal 11 of the CRT 9.

Next, the operation of the circuit shown in FIG. 2 will be described with reference to FIG. 3 which is a wave-form diagram explaining wave-forms at various points of the fly-back transformer shown in FIG. 2. In FIG. 3, reference sign A represents the pulse voltage taken out by the coil 12 and inputted into the inductor 13; B represents the D.C. voltage outputted from the resistor 8; and C represents the parabolic wave obtained by shaping the pulse voltage shown by the reference sign A. It should be noted that the output of the anode voltage from the diode 4a and the output of the D.C. voltage from the resistor 8 are the same as those in the conventional case, and therefore the explanation thereof are omitted here.

Figure 3:
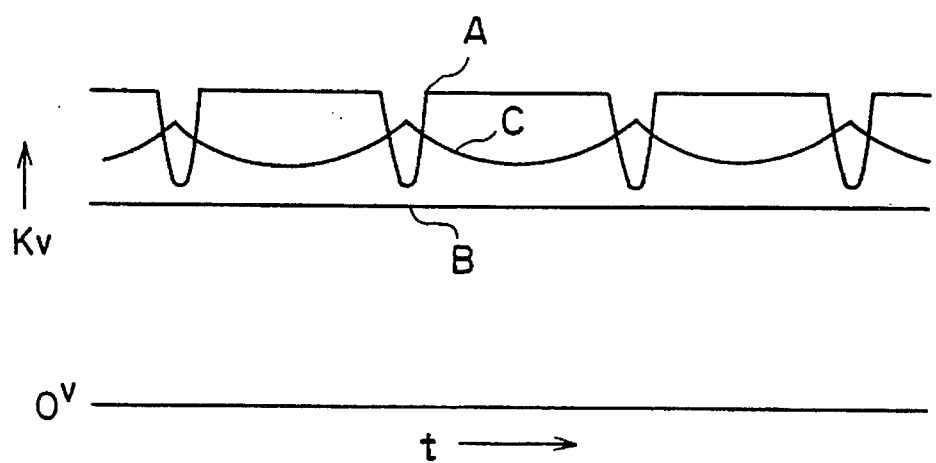
FIG. 3 is a wave-form diagram explaining wave-forms at various points in the above embodiment.

When the pulse voltage generated during a fly-back period of a horizontal sweep signal is applied to the primary coil 2, the pulse voltage A shown in FIG. 3 is induced in the third coil 12 which is wound on the same iron core 1. The pulse voltage A is then inputted to the inductor 13 so that it is integrated by the inductor 13 and the capacitor 14 to be the parabolic wave C shown in FIG. 3. The parabolic wave C is superimposed on the D.C. voltage B, which is outputted from the resistor 8 and shown in FIG. 3, to be the focus voltage applied to the focus terminal 11 of the CRT 9. In this connection, since the capacitor 15 is not connected to the earth, its tolerance voltage is allowed to be a low voltage so that a miniaturized and inexpensive element can be employed as the capacitor 15.

Thus, by applying the focus voltage, which changes in accordance with the change of the parabolic wave and which is synchronous with the horizontal sweep signal of the CRT 9, to the focus terminal 11, the focus performance corresponding to the sweep of the tube surface of the CRT 9 can be made optimum throughout the whole surface of the tube.

It should be noted that, if the voltage taken out from the coil 12 is shaped into the parabolic wave C shown in FIG. 3 by the total circuit of the fly-back transformer and the capacitance 16 at the focus terminal 11 of the CRT 9, the above-mentioned inductor 13 and the capacitor 14 are not necessary.

Embodiment 2

Figure 4:
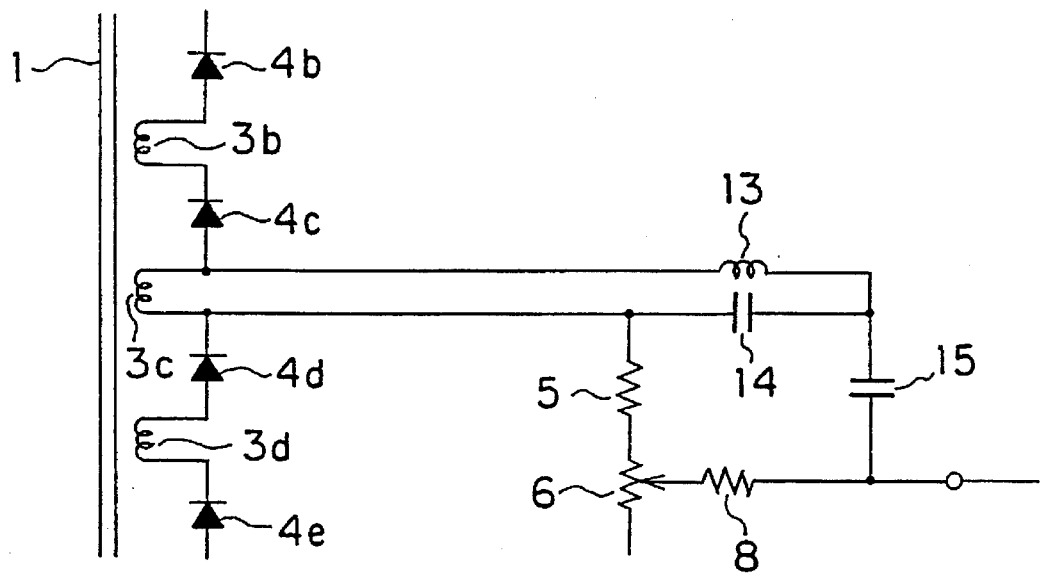
FIG. 4 is a circuit diagram showing a fly-back transformer according to another embodiment of the present invention.
Figure 5:
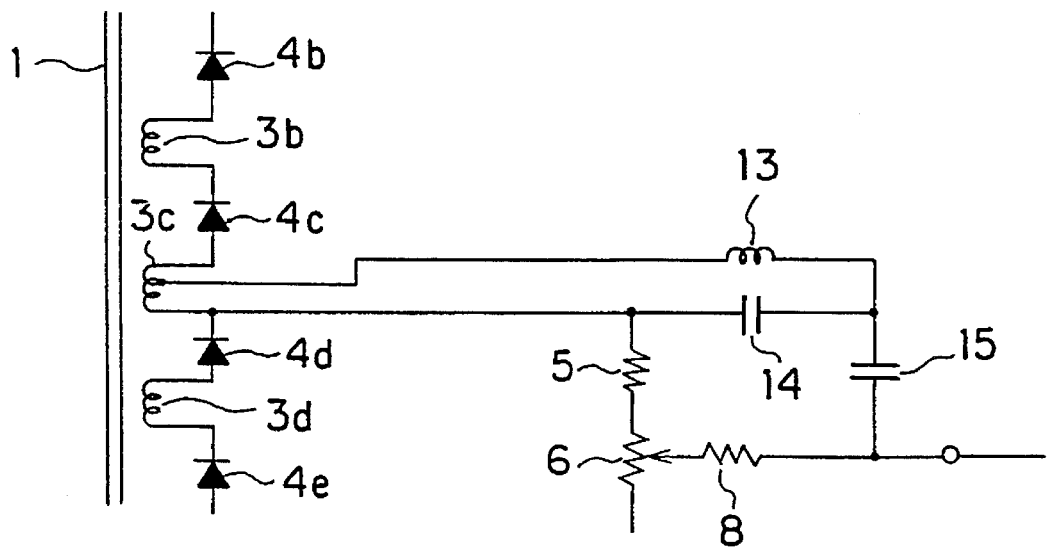
FIG. 5 is a circuit diagram showing a fly-back transformer according to still another embodiment of the present invention.

In the above-described embodiment 1, the third coil 12 is separately wound on the iron core 1, however, it may also be possible to commonly use one coil as a third coil and at least a part of the secondary coil. FIG. 4 and FIG. 5 are such circuit diagrams as above showing fly-back transformers according to the second embodiments of the present invention. In the figures, the parts corresponding to those in FIG. 2 are denoted by the same reference signs so that the explanations thereof are omitted here. FIG. 4 shows a main part of the fly-back transformer of the embodiment 2 in which the whole of the secondary coil 3c is commonly used as the third coil. FIG. 5 shows a main part of the fly-back transformer of the embodiment 2 in which a part of the secondary coil 3c is commonly used as the third coil.

The basic operations of the circuits shown in FIG. 4 and FIG. 5 are similar to the operation in the embodiment 1, however, the circuit shown in FIG. 4 differs from the circuit shown in FIG. 2 in that, in FIG. 4, the pulse voltage A shown in FIG. 3 is taken out across the secondary coil 3c; and the circuit shown in FIG. 5 differs from the circuit shown in FIG. 2 in that, in FIG. 5, the pulse voltage A shown in FIG. 3 is taken out across a connecting point between the secondary coil 3c and the diode 4d and an intermediate tap of the secondary coil 3c. In this embodiment 2 also, if the voltage taken out from the coil 12 is shaped into the parabolic wave C shown in FIG. 3 by the total circuit of the fly-back transformer and the capacitance 16 at the focus terminal 11 of the CRT 9, the above-mentioned inductor 13 and the capacitor 14 are not necessary.

From the foregoing description it will be apparent that, according to the first aspect of the present invention, since the focus voltage is obtained by superimposing the voltage taken out from the third coil with the D.C. voltage taken out from the secondary coil, and since the voltage taken out from the third coil is synchronous with a horizontal sweep signal of the CRT, the focus voltage changes in synchronization with the horizontal sweep of the CRT so that there is an effect in that the optimum performance of the CRT can be realized throughout the whole surface of the CRT.

According to the second aspect of the present invention, since the third coil is realized by a part of the secondary coil, the amount of windings in the fly-back transformer can be reduced so that the fly-back transformer can be miniaturized.

What is claimed is:

1. A fly-back transformer for generating a focus voltage to be applied to a cathode-ray tube, comprising:

an iron core;

a primary coil wound on said iron core for receiving a pulse voltage generated during a fly-back period of a horizontal sweep signal for said cathode-ray tube;

D.C. voltage generating means including at least one secondary coil wound on said iron core, for generating, in response to said pulse voltage, a D.C. voltage;

superimposing voltage generating means for generating a superimposing voltage, said superimposing voltage generating means including a third coil wound on said iron core and having a first and second end, said first end of said third coil being connected to an end of said at least one secondary coil supplying said D.C. voltage; and superimposing means for superimposing said superimposing voltage on said D.C. voltage to generate said focus voltage.

2. A fly-back transformer as claimed in claim 1, wherein said third coil is wound separately from said secondary coil.

3. A fly-back transformer as claimed in claim 1, wherein said third coil is a part of said secondary coil.

4. A fly-back transformer as claimed in claim 3, wherein said superimposing voltage is a parabolic-wave voltage synchronous with said horizontal sweep signal of said cathode-ray tube.

5. A fly-back transformer as claimed in claim 3, wherein said superimposing voltage generating means comprises integrating means for integrating a voltage taken out from said third coil to form a parabolic-wave voltage as said superimposing voltage.

6. A fly-back transformer as claimed in claim 3, wherein said D.C. voltage generating means comprises a plurality of secondary coils wound on said iron core and a plurality of diodes connected to said secondary coils in series respectively, for generating plurality of D.C. voltages to be applied to various electrodes of said cathode-ray tube.

7. A fly-back transformer as claimed in claim 1, wherein said superimposing voltage is a parabolic-wave voltage synchronous with said horizontal sweep signal of said cathode-ray tube.

8. A fly-back transformer as claimed in claim 1, wherein said superimposing voltage generating means comprises integrating means for integrating a voltage taken out from said third coil to form a parabolic-wave voltage as said superimposing voltage.

9. A fly-back transformer as claimed in claim 8, wherein said integrating means includes an inductor and a first capacitor connected in series between said first end and said second end of said third coil.

10. A fly-back transformer as claimed in claim 9, wherein said superimposing means includes a second capacitor having a first and second end, said first end of said second capacitor connected between said first capacitor and said inductor, and said second end of said second capacitor connected to a focus voltage input of said cathode-ray tube.

11. A fly-back transformer as claimed in claim 1, wherein said superimposing voltage generating means generates said superimposing voltage synchronous with said horizontal sweep signal of said cathode-ray tube.

12. A fly-back transformer as claimed in claim 1, wherein said D.C. voltage generating means comprises a plurality of secondary coils wound on said iron core and a plurality of diodes connected to said secondary coils in series respectively, for generating plurality of D.C. voltages to be applied to various electrodes of said cathode-ray tube.

13. A fly-back transformer for generating a focus voltage to be applied to a cathode-ray tube, comprising:

an iron core;

a primary coil wound on said iron core for receiving a pulse voltage generated during a fly-back period of a horizontal sweep signal for said cathode-ray tube;

D.C. voltage generating means including at least one secondary coil wound on said iron core, for generating, in response to said pulse voltage, a D.C. voltage;

superimposing means for generating a parabolic-wave voltage from a voltage taken out from one of said at least one secondary coils, and superimposing said parabolic-wave voltage on said D.C. voltage to generate said focus voltage.

14. A fly-back transformer as claimed in claim 13, wherein said parabolic-wave voltage is synchronous with said horizontal sweep signal of said cathode-ray tube.

15. A fly-back transformer as claimed in claim 13, wherein said superimposing means includes integrating means for integrating said voltage taken out from said one of said at least one secondary coil to form said parabolic-wave voltage synchronous with said horizontal sweep signal of said cathode-ray tube.

16. A fly-back transformer as claimed in claim 13, wherein said D.C. voltage generating means comprises a plurality of secondary coils wound on said iron core and a plurality of diodes connected to said secondary coils in series respectively, for generating plurality of D.C. voltages to be applied to various electrodes of said cathode-ray tube.

17. A fly-back transformer as claimed in claim 16, wherein said superimposing means includes integrating means for integrating said voltage taken out from one of said plurality of secondary coils to form said parabolic-wave voltage.

18. A fly-back transformer as claimed in claim 13, wherein said superimposing means takes out said voltage from said one of said at least one secondary coil via an end terminal of said one of said at least one secondary coil and an intermediate tap between end terminals of said one of said at least one secondary coil.

19. A fly-back transformer as claimed in claim 18, wherein said parabolic-wave voltage is synchronous with said horizontal sweep signal of said cathode-ray tube.

20. A fly-back transformer as claimed in claim 18, wherein said superimposing means includes integrating means for integrating said voltage taken out from said one of said at least one secondary coil to form said parabolic-wave voltage synchronous with said horizontal sweep signal of said cathode-ray tube.

21. A fly-back transformer as claimed in claim 18, wherein said D.C. voltage generating means comprises a plurality of secondary coils wound on said iron core and a plurality of diodes connected to said secondary coils in series respectively, for generating a plurality of D.C. voltages to be applied to various electrodes of said cathode-ray tube.

22. A fly-back transformer as claimed in claim 21, wherein said superimposing means includes integrating means for integrating said voltage taken out from one of said plurality of secondary coils to form said parabolic-wave voltage.

* * * * *